United States Patent [19]

Mott

[11] Patent Number: 5,360,240
[45] Date of Patent: Nov. 1, 1994

[54] METHOD OF CONNECTING PLASTIC PIPE JOINTS TO FORM A LINER FOR AN EXISTING PIPELINE AND A PLASTIC PIPE JOINT FOR FORMING SUCH LINER

[75] Inventor: Keith C. Mott, Houston, Tex.

[73] Assignee: Hydril Company, Houston, Tex.

[21] Appl. No.: 27,280

[22] Filed: Mar. 5, 1993

[51] Int. Cl.⁵ .................. F16L 25/00; F16L 33/16
[52] U.S. Cl. .................. 285/95; 285/334; 285/390
[58] Field of Search ............ 285/333, 334, 355, 390, 285/423, 99, 95; 403/343

[56] References Cited

U.S. PATENT DOCUMENTS

| | | | |
|---|---|---|---|
| 3,791,898 | 2/1974 | Remi | 138/130 X |
| 3,989,284 | 11/1976 | Blose | 403/343 X |
| 4,703,959 | 11/1987 | Reeves et al. | 285/334 X |
| 4,786,090 | 11/1988 | Mott | 285/334 X |
| 4,822,081 | 4/1989 | Blose | 285/334 |
| 5,015,014 | 5/1991 | Sweeney | 285/423 X |
| 5,018,555 | 5/1991 | Hawerkamp | 285/423 X |
| 5,078,430 | 1/1992 | St. Onge | 285/355 |
| 5,106,130 | 4/1992 | Ellsworth et al. | 285/355 |

FOREIGN PATENT DOCUMENTS 54-116733 9/1979 Japan .

*Primary Examiner*—Randolph A. Reese
*Assistant Examiner*—Heather Chun Shackelford
*Attorney, Agent, or Firm*—Vaden, Eickenroht, Thompson, Boulware & Feather

[57] ABSTRACT

A connection for and a method of connecting the ends of two joints of low modulus, low hardness, low strength plastic pipe. The connection includes a threaded box on one joint and a threaded pin on the other joint. The box has tapered, internal, generally dovetail-shaped threads with stab flanks and load flanks and flat roots and crests that are parallel to the longitudinal axis of the pipe. The pin has tapered, external, generally dovetail-shaped threads with stab flanks and load flanks and flat roots and crests that are parallel to the longitudinal axis of the pipe for mating with the internal threads of the box. The threads increase in width in one direction on the box and in the other direction on the pin. When the connection is made up the roots, crests, and flanks of the threads move into engagement to form seals that resist the flow of fluids between the threads. The roots, crests, and flanks remain in engagement even after the compressive stresses created in the pin and/or the tensile stresses created in the box when the connection is made up is relieved by cold flow and continue to seal against internal pressure by the locking effect of the dovetailed-shaped threads.

16 Claims, 1 Drawing Sheet

METHOD OF CONNECTING PLASTIC PIPE JOINTS TO FORM A LINER FOR AN EXISTING PIPELINE AND A PLASTIC PIPE JOINT FOR FORMING SUCH LINER

This invention relates to plastic pipe for use in lining existing pipelines, generally, and in particular to the connection used to connect the joints of plastic pipe.

In Nipak Bulletin "Sewer Renewal by Inspection with Nipak Polyethylene Pipe" Dallas Tex., published by Nipak by May 9, 1973 or earlier and the article by St. Onge, H. S., "Updating Aging Sewers Without Trenching", *Engineering and Contract Record*, July 1974, pp. 40–44, polyethylene liners for existing sewer lines and water lines are described along with the method of installing these liners. The liners were made up of joints of polyethylene pipe the ends of which were connected by welding. The pipe joints were twenty or more feet long, which required excavating a substantial amount of dirt at the end of the pipe in which the liner was to be installed so that the long joints could be pulled or pushed into the line without unduly bending the liner.

Japanese Patent No. 54-116733, dated Sep. 11, 1979 shows pipe sections of plastic pipe that are short enough to be lowered into a manhole and aligned with the pipeline to be lined. The pipe joints shown in this patent are connected by bell and spigot connections. After the liner is in place, the annulus between the liner and the old pipeline is filled with cement to anchor the liner in the pipeline.

U.S. Pat. Nos. 4,796,669, 4,958,959, and 5,078,430 that are assigned to Duratron Systems Limited of Canada disclose two types of connections for use with plastic pipe that is to be pushed or pulled into an existing pipeline to form a liner. One connection has mating buttress type threads. When the joint is made up, the end of the pin engages an O-ring positioned in the box to seal the connection. In addition, the end of the box is V-shaped in cross-section to engage a V-shaped annular recess on the pin to prevent the female portion of the connection from "sliding on up over the male portion" when the pipe is being pushed into the sewer line. This joint cannot be used if the pipe is to be pulled into the existing pipeline, because pulling on the joint will cause the reduced sections in the pipe wall to elongate and unseat the O-ring and the end of the pin.

The other connection disclosed in these patents is of the force fit type. The male connection is tapered with an annular groove in the taper. The female connection is also tapered with an inwardly projected annular portion. When the male and female connectors are pushed together, the female connector or box expands outwardly as the male connector contracts slightly to permit the projecting annular portion on the female connector to snap into the annular groove in the male connector to connect the two joints of pipe.

Both of these connections are unsatisfactory because they will both leak sooner or later. With the buttress-O-ring connection, it will probably be sooner. This connection has very little resistance to forces tending to pull the pin out of the box, since only the thin-walled buttress threads resist such movement. Therefore, since internal pressure acts against the end of the pin urging the pin out of the box and creating axial stress in the buttress threads, and, since the internal pressure acts on the reduced wall thickness of the box thus expanding the box, any cold flow of the plastic will loosen the threads and allow the joint to leak. With the force fit connection, cold flow will also cause it to eventually leak as the initial hoop stresses holding the pin and the box together will be relieved over time.

Therefore, it is an object of this invention to provide a method of connecting the ends of plastic pipe that will maintain a seal against the internal pressure of the pipe even after the cold flow or creep of the plastic relieves the initial stress placed in the plastic when the joint was made up.

It is a further object and feature of this invention to provide such a connection in which the threads are dovetailed in shape and have engaging roots, crests, and flanks that lock the box and pin together even after initial stresses in the plastic are relieved by creep or cold flow so that pressure inside the pipe will energize and maintain the sealing capacity of the wedge-shaped threads as the pressure acts against the internal surface of the pin member.

It is a further object and feature of this invention to provide such a connection having engaging thread flanks that provide continuing engaging helical shoulders having a surface area greater than the cross-sectional area of the pipe to resist either tensile forces or compressive forces exerted on the connection as the pipe is pulled or pushed into a pipeline to form a liner for the pipeline.

These and other objects, advantages, and features of this invention will be apparent to those skilled in the art from a consideration of this specification including the attached drawings and appended claims.

IN THE DRAWINGS

Figure 1:
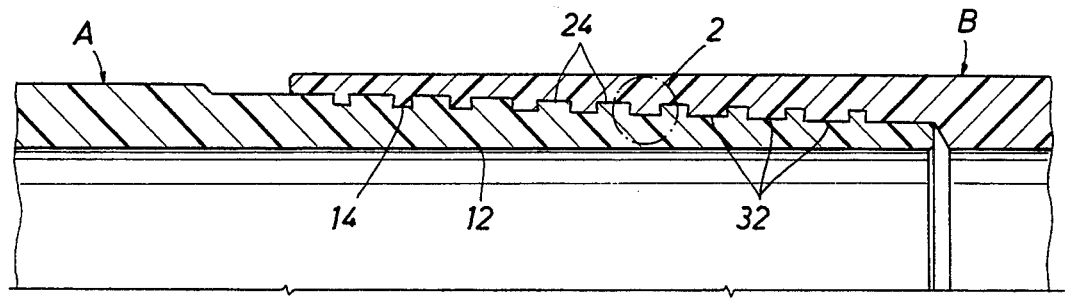
FIG. 1 is a sectional view of the connection of this invention.

The connection shown in FIG. 1 is described in detail in U.S. Pat. No. 4,917,409 that issued Apr. 17, 1990 and is assigned to the assignee of this invention. The connection comprises box 10 and pin 12 that are integral parts of joints A and B. As shown in the '409 patent, a threaded and coupled connection could also be used. The '409 patent is incorporated herein by reference.

Figure 2:
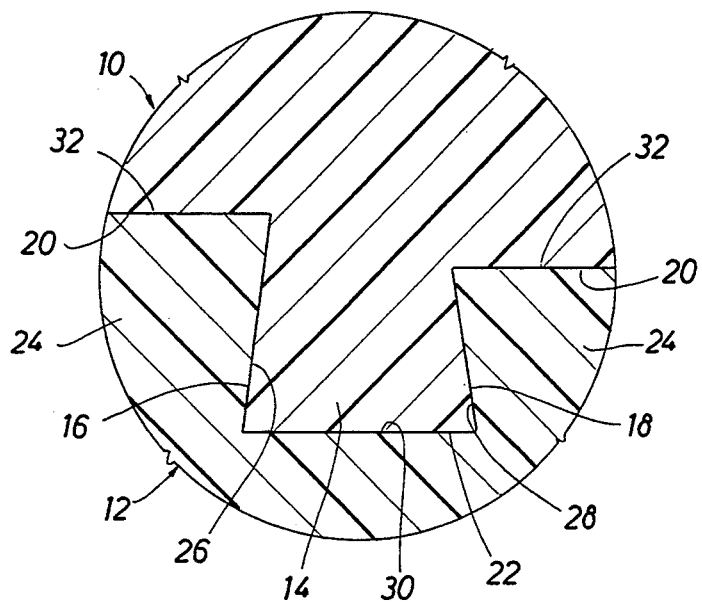
FIG. 2 is a view on an enlarged scale of the portion of the connection in FIG. 1 inside of circle 2.

As best seen in FIG. 2, where the portion of the connection in circle 2 in FIG. 1 is shown on an enlarged scale, box 10 has tapered, internal, generally dovetail shaped threads 14 with stab flanks 16 and load flanks 18. The threads also have flat roots 20 and crests 22 that are parallel to the longitudinal axis of the pipe. The pin is provided with tapered, external, generally dovetail shaped threads 24 having stab flanks 26 and load flanks 28. The threads on the pin also have flat roots 30 and crests 32 that are parallel to the longitudinal axis of the pipe for mating with the internal threads of the box to make up a pipe connection.

The threads increase in width in one direction on the box and in the other direction on the pin so that the roots, crests, and flanks of the threads move together and form seals that resist the flow of fluids between the threads with the roots and crests being designed to move into engagement before both the load flanks and stab flanks move into engagement to complete the sealing of the connection when the connection is fully made up.

In accordance with this invention, the method of connecting the two joints A and B with this connection includes the steps of producing a normal force between the load flanks, stab flanks, and roots and crests when the connection is fully made up that is sufficient to produce a compressive hoop or circumferential stress in the pin, a tensile hoop or circumferential stress in the box, and a normal force between the roots and crests and stab and load flanks sufficient to seal the connection initially. When the liner is placed in service, any internal pressure will tend to relieve the compressive stress created in the pin when the connection was made up. Over time, the plastic will cold flow or creep sufficiently to relieve some, if not all, the stress in the pin and box, but the seal between the flanks, roots, and crests will be maintained because the internal pressure and the shape of the threads will maintain the threads in sealing engagement even though the pressure fluctuates from zero to design line pressure.

Figure 3:
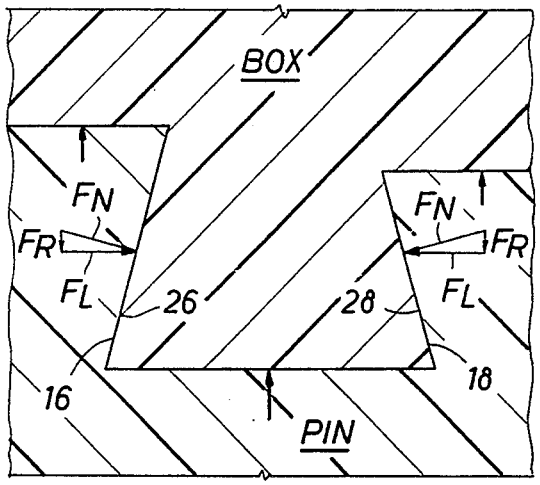
FIG. 3 is a free force diagram of one of the threads on the box showing the force components produced by the internal pressure acting on the pin, one of which $F_R$, urges the thread into sealing engagement with the pin.
Figure 4:
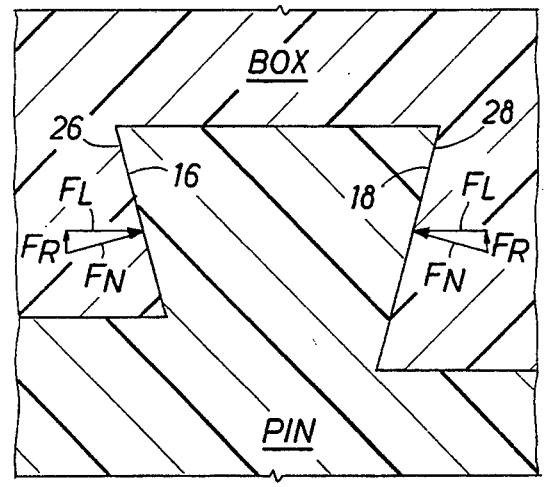
FIG. 4 is a free force diagram of one of the threads on the pin showing the force components produced by the internal pressure acting on the pin, one of which $F_R$, urges the thread into sealing engagement with the box.

This results because of the dovetailed shape of the threads. FIGS. 3 and 4 are free body diagrams of a thread on the box and a thread on the pin, respectively. Internal pressure P acting on pipe joint B adjacent box 10 urges the tapered flanks 16 and 18 of the threads on the box against the tapered flanks 26 and 28 of the pin to produce normal force $F_N$ between the engaging surfaces. $F_N$ has radial components $F_R$ and longitudinal components $F_L$. The radial components $F_R$ hold the threads in sealing engagement as a result of internal pressure in the liner.

In the same manner, if the external pressure is greater than the internal pressure, the same radial components will be produced but in the opposite direction. This is an important feature for sewer lines where infiltration of ground water into the sewer can cause the flow of water reaching the sewage treatment plant to exceed the capacity of the plant.

An additional feature and advantageous result of the use of this connection on plastic liner pipe is that the threads emulate extremely large shoulders on each joint of pipe to engage and transmit any longitudinal compressive or tensile force on one joint of pipe to the next joint thereby reducing any stress concentrations that may occur and cause damage or permanent deformation to the threads on each joint of pipe.

For example, there are about ten threads on each box and pin of the connection shown that are in engagement when the connection is made up. The mean diameter of the threads times the thread height times 360° times 10 provides a very large force transmitting area between the pin and the box.

The following is a data sheet for three different pipe sizes using Series 500 Type 511P Connections for the connection shown in FIG. 1 for polyethylene pipe in sizes 6", 8", and 12" with explanatory notes at the bottom of the Table The following data sheet for three sizes of pipe is for low strength, low modulus, low hardness plastic pipe, such as polyethylene pipe, using the dovetail wedge thread connections described above and the parameters listed below the data sheet. Thread compound is used during and upon rotational makeup of the connection.

|  | Size | | |
|---|---|---|---|
|  | 6 | 8 | 12 |
|  | SDR | | |
|  | 11 | 21 | 11 |
| PIPE | | | |
| OD (inches) | 6.625 | 8.625 | 12.750 |
| Wall (inches) | 0.602 | 0.411 | 1.159 |
| Tension Rating (lbs) | 9,100 | 8,500 | 33,800 |
| Pressure Rating (psi) | 160 | 80 | 160 |
| CONNECTION | | | |
| Tension Rating (lbs) | 5,200 | 5,000 | 20,400 |
| Compression Rating (lbs) | 4,000 | 3,900 | 15,500 |
| Maximum Overpull (lbs) | 11,000 | 11,000 | 43,100 |
| Pressure Rating (psi) | 105 | 50 | 100 |

Pipe tension rating is based on nominal pipe body area and material long term tension design stress at 73° F.
Pipe pressure rating is based on nominal pipe body OD, minimum pipe body wall thickness and material long term tension design stress at 73° F.
Connection tension rating is based on nominal connection critical section area and material long term tension design stress at 73° F.
Connection compression rating is based on nominal connection compression area and material long term compression design stress at 73° F.
Connection maximum overpull is based on nominal thread bearing area and material compressive strength at 73° F.
Connection pressure rating is based on nominal pipe body OD, minimum connection wall thickness and material long term tension design stress at 73° F.

At the present time, in the preferred embodiment of the connection of this invention, the roots and crests have an initial interference fit upon rotational makeup of the connection sufficient to produce, by design, circumferential stresses that are 12.5% of the hydrostatic design basis of the pipe material, said stresses being tensile in the box and compressive in the pin. Further experience with the connection may indicate that the stresses should be a different percentage of the hydrostatic design basis of the pipe material.

The hydrostatic design basis is defined in ASTM D 2837-90 as one of a series of established stress values for a compound. It is obtained by categorizing the long-term hydrostatic strength.

The long-term hydrostatic strength is defined in ASTM D 2837-90 as the estimated tensile stress in the wall of the pipe in the circumferential orientation that when applied continuously will cause failure of the pipe at 100,000 hours.

The box tensile hoop stress remains below 50% of the hydrostatic design basis of the pipe material when internal pressure equal to the internal pressure rating of the connection is applied to the connection. 50% of the hydrostatic design basis equates to the hydrostatic design stress using a service design factor of 0.5.

The hydrostatic design stress is defined in ASTM D 2837-90 as the estimated maximum tensile stress in the wall of the pipe in the circumferential orientation due to internal hydrostatic pressure that can be applied continuously with a high degree of certainty that failure of the pipe will not occur. The hydrostatic design stress is determined by applying a service design factor to the hydrostatic design basis.

Both flanks form load bearing areas. Each area is greater than (approximately 200%) the cross-sectional area of the connection critical section. Upon rotational makeup of the connection, the stab flanks and load flanks of the pin bear on the stab flanks and load flanks, respectively, of the box (as well as the box flanks bears on the pin flanks). The bearing pressure due to assembly acting between these areas is related to the torque applied to the connection upon rotational makeup of the connection.

Bearing pressures exist at the pin/box interface formed by the stab flanks, load flanks, and roots and crests. Bearing pressures between these surfaces resist the passage of fluid through the connection regardless of the location of the higher pressure, external or internal. Thread compound remaining in the connection upon rotational makeup further reduces the propensity of the connection to pass fluids by filling minute imperfections in the plastic type pipe.

Axial tension loads applied to the connection increases the bearing pressure between the load flanks of the threads. Axial compression loads applied to the connection increases the bearing pressure between the stab flanks of the threads. (Load flanks face away from the end of the pipe. Stab flanks face towards the end of the pipe.) The pipe material has a low modulus of elasticity, thus, the connection subject to axial loads can elongate without yielding and distribute axial loads over all the threads. Large flank areas cause the bearing pressure on the flanks due to axial loads to be low. Thus, there is minimal deformation of the flanks due to axial load.

In some non-wedge thread connections, such as the buttress thread connection shown in the '669, '959, and '430, patents discussed above, definitive shoulders are used to bear compressive loads. Shoulders machined into the pipe wall have small bearing areas. Thus, the same loads discussed above would cause higher bearing pressures on shouldered connections. High bearing pressure cause high deformation. High deformation may cause connection failure.

Bearing pressures on the thread surfaces of the wedge thread of FIG. 1 are not high enough to cause permanent deformation of the thread form. Thus, the connection can tolerate multiple makeups and breakouts without damage.

The thread form is also damage tolerant. The threads, complimented with thread compound, form a pressure seal. Damage, such as dents, cuts and abrasions, that would be deleterious to other seals, such as shoulder seals and resilient seals, have little or no effect on the pressure integrity of this thread seal since the seal is formed by the long, tortuous path of the threads.

When there is pressure in the plastic pipe, circumferential or hoop stress in the pipe wall results. This causes the pipe to expand. When the volume of fluid contained in the pipe is held constant, the expanded displacement is held constant. Thus, the plastic material will creep or cold flow and relieve the stress in the pipe wall without a change in geometry.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A method of providing a pressure tight connection between the ends of two joints of low modulus, low hardness, low strength plastic pipe each joint having a threaded box on one end and a threaded pin on the other end, the method including the steps of providing the box with tapered, internal, generally dovetail-shaped threads having stab flanks and load flanks and flat roots and crests that are parallel to the longitudinal axis of the pipe, providing the pin with tapered, external, generally dovetail-shaped threads having stab flanks and load flanks and flat roots and crests that are parallel to the longitudinal axis of the pipe for mating with the internal threads of the box to make up a pipe connection, said threads increasing in width in one direction on the box and in the other direction on the pin, inserting the pin into the box and rotating one relative to the other to cause the roots, crests, and flanks of the threads to move into engagement to form seals that resist the flow of fluids between the threads by first moving one of the flanks into engagement followed by the roots and crests moving into engagement along with the other flank and continuing rotation to produce a normal force between the roots and crests and stab and load flanks sufficient to seal the connection initially, said roots, crests, and flanks remaining in engagement after the normal forces in the pin and box are relieved by cold flow to continue to seal against internal pressure by the locking effect of the dovetailed-shaped threads.

2. A threaded pipe connection of low strength, low modulus, low hardness plastic pipe comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe connection, said threads increasing in width in one direction on the box and in the other direction on the pin so the roots, crests, and flanks of the threads move together and form seals that resist the flow of fluids between the threads with the roots and crests being designed to move into engagement before both the load flanks and the stab flanks move into engagement to complete the sealing of the connection as the connection is fully made up, said roots and crests having an interference fit sufficient to produce hoop stresses in the box and pin that are a percentage of the hydrostatic design basis of the plastic.

3. The threaded pipe connection of claim 2 in which the hoop stress in the box and pin is 50% or less of the hydrostatic design basis of the plastic.

4. The threaded pipe connection of claim 2 in which the hoop stress in the box and pin is about 10–20% of the hydrostatic design basis of the plastic.

5. The threaded pipe connection of claim 2 in which the hoop stress in the box and pin is about 12.5% of the hydrostatic design basis of the plastic.

6. The threaded pipe connection of claims 2, 3, 4, or 5 in which the pipe is made of polyethylene.

7. A method of providing a pressure tight connection between the ends of two joints of low modulus, low hardness, low strength plastic pipe the method including the steps of providing a threaded pin on each end of each joint and an internally threaded coupling for connecting to the pins of two axially aligned joints, providing the coupling with two oppositely tapered, internal, generally dove-tail-shaped threads with stab flanks and load flanks and flat roots and crests that are parallel to the longitudinal axis of the coupling and providing each pin with tapered, external, generally dovetail-shaped threads with stab flanks and load flanks and flat roots and crests that are parallel to the longitudinal axis of the pipe for mating with one of the internal threads of the box to connect one end of each pipe to the coupling, the method further including the steps of increasing the width of the threads in one direction on the box and in the other direction on the pin, moving the roots, crests, and flanks of each set of mating threads into engagement to form seals that resist the flow of fluids between the threads by first moving the roots and crests into engagement and then moving both the load flanks and the stab flanks into engagement to produce a normal force between the roots and crests and stab and load flanks sufficient to produce a compressive stress in each pin and a tensile stress in the coupling and a normal force between the roots and crests and stab and load flanks of all the threads to seal the connection initially, said roots, crests, and flanks of each set of threads being urged into sealing engagement by both internal and external pressure on the threaded connection.

8. A threaded pipe connection of low strength, low modulus, low hardness plastic pipe comprising a coupling having tapered, internal, generally dovetail-shaped threads with stab flanks and load flanks and flat roots and crests that are parallel to the longitudinal axis of the coupling and a pin on the end of a pipe joint having tapered, external, generally dovetail-shaped threads with stab flanks and load flanks and flat roots and crests that are parallel to the longitudinal axis of the pipe joint for mating with the internal threads of the coupling to make up a pipe connection, said threads increasing in width in one direction on the coupling and in the other direction on the pin so the roots, crests, and flanks of the threads move together and form seals that resist the flow of fluids between the threads with the roots and crests being designed to move into engagement before both the load flanks and the stab flanks move into engagement to complete the sealing of the connection as the connection is fully made up, said roots and crests having an interference fit sufficient to produce hoop stresses in the coupling and pin that are a percentage of the hydrostatic design basis of the plastic.

9. The threaded pipe connection of claim 8 in which the hoop stress in the box and pin is 50% or less of the hydrostatic design basis of the plastic.

10. The threaded pipe connection of claim 8 in which the hoop stress in the box and pin is about 10–20% of the hydrostatic design basis of the plastic.

11. The threaded pipe connection of claim 8 in which the hoop stress in the box and pin is 12.5% of the hydrostatic design basis of the plastic.

12. The threaded pipe connection of claims 7, 8, 9, or in which the pipe is made of polyethylene.

13. A method of providing a pressure tight threaded connection between the ends of two joints of low modulus, low hardness, low strength plastic pipe after the plastic has crept sufficiently to relieve the stress in the plastic due to initial make-up of the connection, comprising the steps of inclining at least one flank of the thread on the pin to lie in a plane that intersects the longitudinal axis of the pipe at an acute angle to increase the width of the crest of the thread beyond the width of the root and inclining a flank on the box to mate with the inclined flank on the pin so that both internal and external pressure create a normal force between the inclined flanks having a component that urges the flanks, roots, and crests into sealing engagement.

14. The method of claim 13 further including the step of coating the threads with thread lubricant to fill any voids between the flanks and the crests and roots.

15. The method of claim 13 further including the step of providing the pipe made of polyethylene.

16. A method of connecting two joints of plastic pipe using a pin on one joint and a box on the other having mating, tapered, dovetail shaped threads having flat roots and crests and inclined flanks and thread lubricant coating the threads that will remain in sealing engagement due to either internal pressure or external pressure even though the plastic creeps sufficiently to relieve the initial make-up stress in the threads, the method comprising the steps of rotating one of the pin and box relative to the other until the roots and crests of the threads engage, continuing relative rotation to move the flanks and roots and crests into sealing engagement and creating hoop compressive stress in the pin and hoop tensile stress in the box, whereby internal or external pressure creates a normal force between the engaged flanks having a component urging the flanks, and roots and crests into sealing engagement.

* * * * *